United States Patent

Kobayashi et al.

Patent Number: 5,383,963
Date of Patent: Jan. 24, 1995

[54] COMPOSITE FIBERS OF POTASSIUM HEXATITANATE AND TITANIUM DIOXIDE

[75] Inventors: Isamu Kobayashi, Nara; Yuji Aramaki, Ikoma, both of Japan

[73] Assignee: Kubota Corporation, Osaka, Japan

[21] Appl. No.: 247,634

[22] Filed: May 23, 1994

[30] Foreign Application Priority Data

Feb. 22, 1993 [JP] Japan .................................. 5-57876
Feb. 22, 1993 [JP] Japan .................................. 5-57877

[51] Int. Cl.$^6$ ............................................. C09K 3/14
[52] U.S. Cl. .............................. 106/36; 188/251 A; 501/95; 501/136
[58] Field of Search .................... 188/251 A; 106/36; 501/95, 136

[56] References Cited

U.S. PATENT DOCUMENTS 4,810,439 3/1989 Fujiki et al. .
4,944,373 7/1990 Ohya et al. ................. 188/251 A
5,127,949 7/1992 Nakazawa et al. .................. 106/36

*Primary Examiner*—Mark L. Bell
*Assistant Examiner*—Chris Gallo
*Attorney, Agent, or Firm*—Armstrong, Westerman, Hattori, McLeland & Naughton

[57] ABSTRACT

A platelike polycrystalline fiber having a composite phase which consists of potassium hexatitanate crystals and titanium dioxide crystals mixed therewith is prepared by heating a mixture of titanium compound and potassium compound to obtain a melt, cooling the melt to obtain a lump of fibers, treating the lump of fibers in an aqueous acid solution to control the potassium content of the fibers to 1 to 13.5 weight %, and heat-treating the resulting fibers at 900° to 1300° C.

The composite fiber is suitable as fibers to be included in friction materials for slide members of automobiles and like brake devices.

6 Claims, 5 Drawing Sheets

COMPOSITE FIBERS OF POTASSIUM HEXATITANATE AND TITANIUM DIOXIDE

FIELD OF THE INVENTION

The present invention relates to composite fibers of potassium hexatitanate crystals and titanium dioxide crystals having outstanding characteristics in respect of wear resistance, heat resistance, heat insulation, refractory properties and reinforcing properties and suitable for friction materials for brake devices of automobiles, railroad cars, aircraft, industrial machines, etc.

BACKGROUND ART

Friction materials including chrysotile asbestos fibers therein have been conventionally used for brake devices. However, the friction material including chrysotile asbestos is low in thermal stability and rapidly decreases in coefficient of friction at relatively low temperatures to undergo fading, while the friction material markedly wears away at high temperatures. Thus it has been desired to alleviate-these problems. Furthermore, there is a tendency to control the use of asbestos because of its carcinogenicity from the viewpoint of environmental hygiene, so that it is strongly demanded to develop substitutes for chrysotile asbestos fibers.

To meet the demand, attempts have been made to use in various fields for engineering applications potassium titanate fibers which are represented by the general formula $K_2O \cdot nTiO_2$ and typical of which are potassium hexatitanate fiber ($K_2Ti_6O_{13}$), potassium tetratitanate fiber ($K_2Ti_4O_9$) and potassium octatitanate fiber ($K_2Ti_8O_{17}$), as substitutes for asbestos fibers. Among these, potassium hexatitanate fiber is effective for the prevention of fading because of its high heat resistance, has Mohs' hardness of about 4, is therefore less likely to abrade the adjoining materials, and is useful, for example, for preventing abnormal actuation of brakes since it has less hygroscopicity and is not reactive with water. By virtue of these properties, this fiber was proposed to use for friction materials for automotive brake pads, etc. (Unexamined Japanese Patent Publications SHO 61-191599 and HEI 1-294553).

However, it has been found that although the friction material including the potassium hexatitanate fibers has increased resistance to wear, the coefficient of friction thereof at low temperatures (up to about 250° C.) is rather lower than that of the friction material including the chrysotile asbestos fibers. With an increase in the speed of vehicles, a higher coefficient of friction is required of the friction material for brake devices in recent years, and it is desired to provide friction materials retaining a high coefficient of friction over a low to high, wide temperature range.

The present invention provides a fiber material satisfying the above demand, that is, a polycrystalline fiber having a composite phase or structure which consists of potassium hexatitanate crystals and titanium dioxide crystals as mixed therewith.

Incidentally, rutile-priderite-potassium hexatitanate composite fiber is known as a polycrystalline fiber having a composite structure which comprises potassium hexatitanate crystals and other crystals (Unexamined Japanese Patent Publications SHO 60-34617 and SHO 60-259627), whereas this composite fiber differs from the composite fiber of the present invention in that it contains priderite. The composite fiber containing priderite not only exhibits lower strength but also has the problem of becoming brown in its entirety.

SUMMARY OF THE INVENTION

The composite fiber of the present invention is a polycrystalline fiber having a composite phase wherein potassium hexatitanate crystals and titanium dioxide crystals are present in a mixed state. The composite phase is a structure obtained by a melting production process wherein when potassium is removed from a mass or lump of potassium dititanate fibers while loosening the lump in a wash liquid, $K^+$ ions are dissolved out until the potassium content of the fibers decreases to 1 to 13.5 wt. %, consequently making the titanium content of the fibers exceed the titanium content of potassium hexatitanate, potassium hexatitanate crystals are formed by a heat treatment, and the excess of titanium is formed into titanium dioxide crystals at the same time.

When composite fibers of the present invention are used for a friction material for brake devices, it is desired that the composite fibers be included in an amount of 3 to 50% by weight.

DETAILED DESCRIPTION OF THE INVENTION

Figure 1:
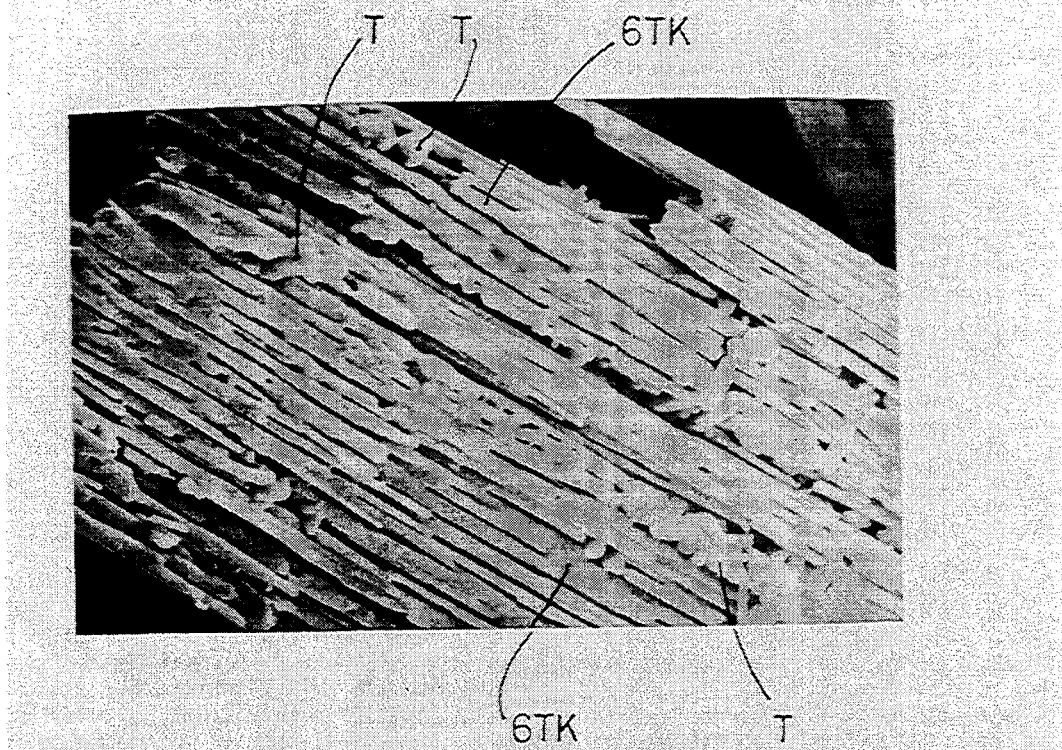
FIGS. 1 to 4 are photomicrographs showing composite fibers of the invention.
Figure 2:
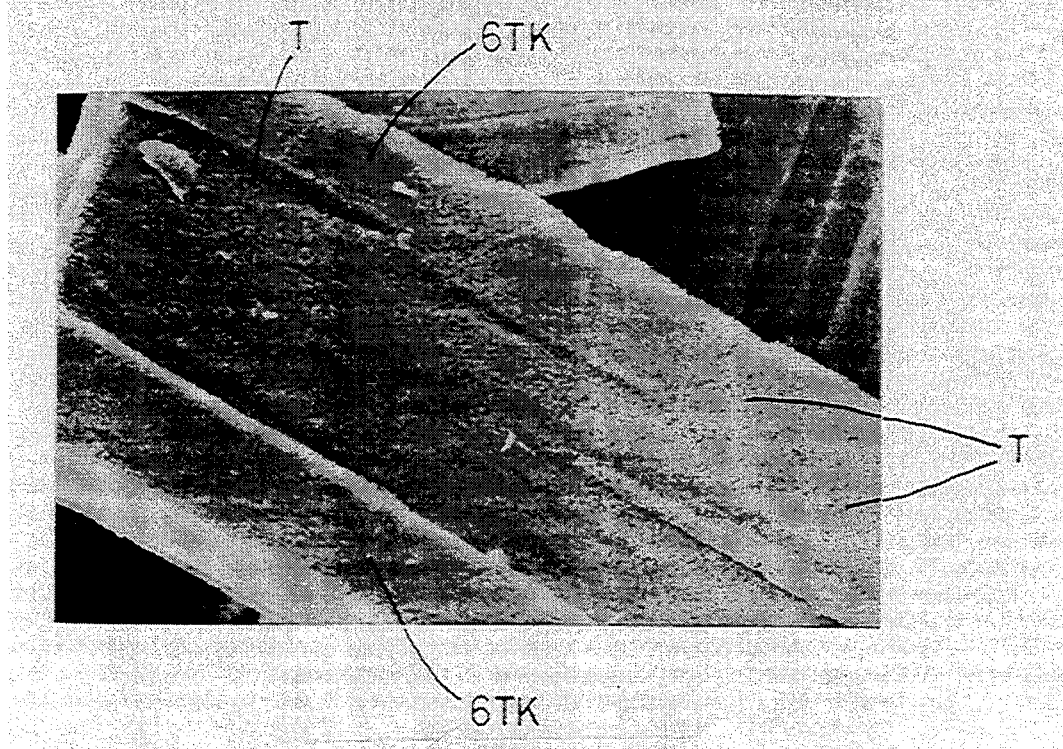
Figure 3:
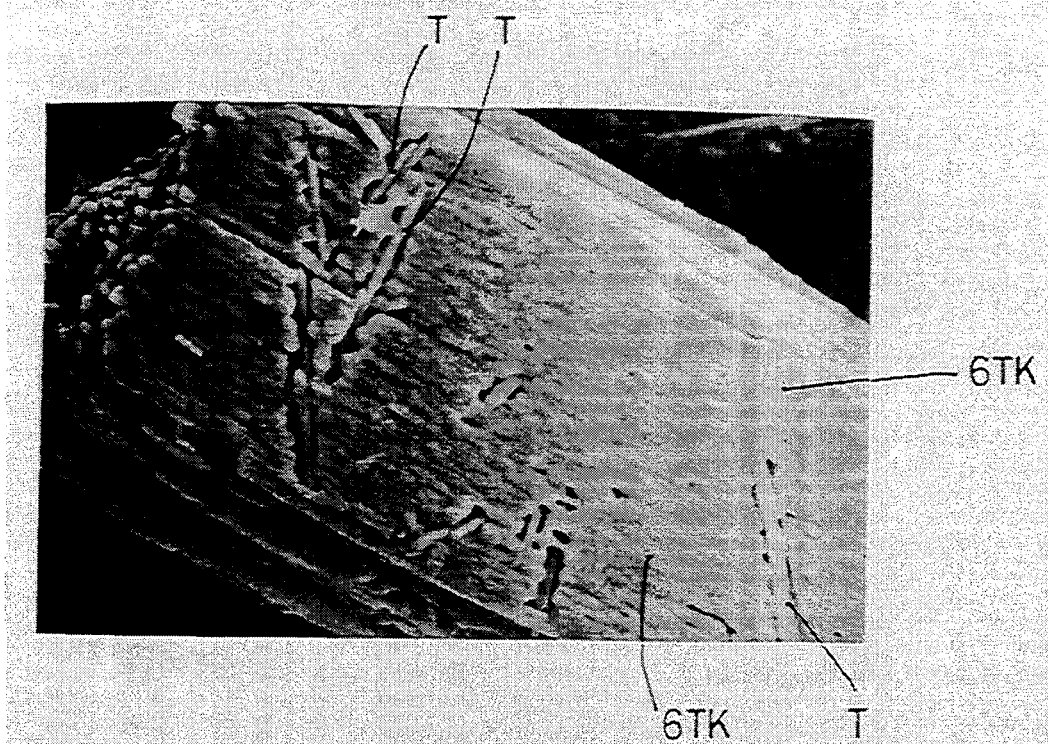
Figure 4:
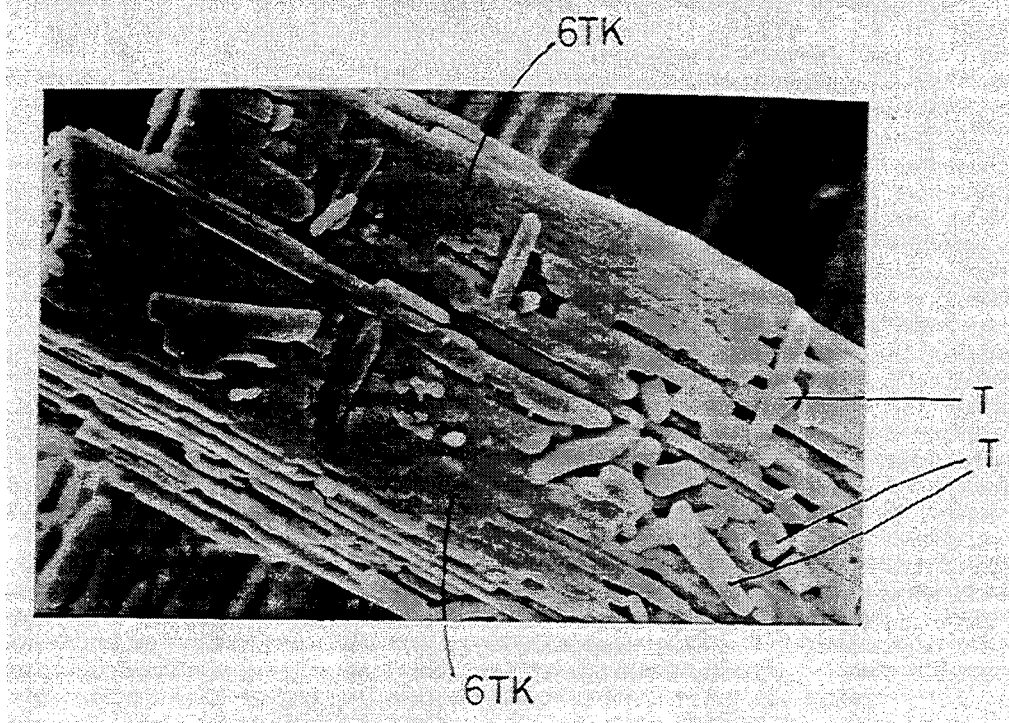

The composite fiber of the present invention is characterized in that the fiber is a polycrystalline fiber having a composite structure which consists essentially of potassium hexatitanate crystals ($K_2Ti_6O_{13}$) and titanium dioxide crystals ($TiO_2$) which are present in a mixed state. An advantageous feature of the composite polycrystalline structure of the fiber according to the present invention can be obtained by a melting process.

The raw material to be used in the melting process is a mixture of a titanium compound convertible to titania or titanium dioxide ($TiO_2$) by heating and a potassium compound convertible to potassium oxide ($K_2O$) by heating in such a ratio as to result in a $TiO_2/K_2O$ molar ratio of 1.5 to 2.5. The melting process comprises steps of heating the mixture at about 950° to about 1100° C. to prepare a melt, cooling the melt to obtain a lump of potassium dititanate fibers, treating the lump of fibers in a wash liquid to dissolve out $K^+$ ions until the potassium content of the fibers decreases to 1 to 13.5 wt. % (this percentage is based on the fibers in an anhydrous condition), while loosening the fibers, and heat-treating the resulting fibers at a temperature of 900° to 1300 ° C.

The titanium compound to be used as one of raw materials is a purified anatase, a purified rutile or the like. The reason is that since naturally occurring anatase sand or rutile sand contains large quantities of impurity elements (Fe, Si, Cr, Al, Zr, V and the like), many cracks are likely to occur in the fibers by heat treatment and it is difficult to maintain the fibers in the proper size. Accordingly, it is desirable to use purified anatase or purified rutile having a relatively high purity (at least about 98%). The potassium compound to be mixed with the titanium compound is typically potassium carbonate ($K_2CO_3$). Potassium hydroxide, nitrate, etc. are also usable.

The mixing ratio of the titanium compound and the potassium compound is 1.5 to 2.5 in terms of $TiO_2/K_2O$ molar ratio in order to cause the melt thereof to produce fibers of potassium dititanate crystals ($K_2Ti_2O_5$) as a primary phase (initially occurring phase) during the cooling solidification proceeding. The resulting lump of potassium dititanate fibers can be deprived of potassium and loosened relatively easily by virtue of its crystal structure. From the viewpoint of ease of dispersion in water, the molar ratio is preferably 1.7 to 2.0.

The fiber lump obtained by cooling the molten mixture for solidification is a bundle-like aggregate of potassium dititanate fibers which are grown as primary-phase fibers along a temperature gradient in the cooling solidification proceeding.

The amount of $K^+$ ions to be dissolved out by the potassium removing-loosening proceeding is so adjusted that the potassium content of the fibers will be 1 to 13.5 wt. %. The $TiO_2/K_2O$ molar ratio of the fibers (hydrated potassium titanate) is greater than 6. The amount of $K^+$ ions to be dissolved out is thus adjusted because if it is smaller, titanium dioxide crystals are not formed by heat treatment.

Although water or hot water is usable as the wash liquid for the potassium removing treatment, it is desirable to use an aqueous acid solution as adjusted to a suitable concentration, such as 0.01–1% aqueous solution of sulfuric acid, 0.01–1% aqueous solution of hydrochloric acid or 0.1–2% aqueous solution of acetic acid, to ensure an efficient treatment. When required, the treatment is conducted with stirring using a propeller, mixer or the like. The amount of $K^+$ ions to be dissolved out is adjustable, for example, by using a different wash liquid, or by varying the amount of wash liquid, the intensity of stirring or the treating time.

The fibers collected from the wash liquid (polycrystalline fibers of hydrated potassium titanate) have a chemical composition corresponding to a mixed phase of potassium hexatitanate crystals and titanium dioxide crystals but retain some feature of the precursor, i.e., potassium dititanate crystals, with respect to their crystalline structure, so that the fibers are heat-treated and thereby formed into potassium hexatitanate crystals and titanium dioxide crystals.

The heat treatment is accomplished by holding the fibers heated at a temperature of 900° to 1300° C. as previously stated. The lower limit of the treating temperature is 900° C. because if the temperature is lower (especially not higher than 800 ° C.), the composite fiber obtained has poor crystallinity and is chemically unstable. The upper limit is 1300° C. to avoid melting of the potassium hexatitanate crystals.

When the heat treatment is conducted at lower temperatures (up to about 970° C.) in the above range, the form of titanium dioxide is anatase while the form of titanium dioxide is rutile when the heat treatment is conducted at higher temperatures (at least about 1050° C.) in the above range. At the heat treatment in an intermediate temperature range (about 1000° C.), the form of titanium dioxide is a mixed phase of anatase and rutile.

Although the transformation of crystal structure can be achieved by the heat treatment in the foregoing temperature range for several minutes, the treating time relates to densification of crystal grains and also to the fiber strength, so that the heat treatment is carried out for at least 10 minutes, preferably for 0.5 to 3 hours, to obtain enhanced fiber strength.

As previously stated, according to the production process described, the heat treatment (for transformation of the crystal structure of fibers) provides to form a composite polycrystalline structure wherein potassium hexatitanate crystals are present in such a state as mixed with titanium dioxide crystals. The crystallization of titanium dioxide is attributable to the potassium removing-loosening proceeding, preceding the heat treatment, by which $K^+$ ions are dissolved out until the potassium content of the fibers reduces to 13.5 wt. % or less. It should be noted that this percentage is based on the fibers in an anhydrous state. When the chemical composition of the fibers (crystals of hydrated potassium titanate) as collected after $K^+$ ions have been dissolved out from the primary-phase fiber lump (crystals of potassium dititanate) is expressed in $TiO_2/K_2O$ molar ratio, these fibers, which are up to 13.5 wt. % in pottasium content, are represented by "$TiO_2/K_2O > 6$" and therefore exceed potassium hexatitanate fibers ($TiO_2/K_2O = 6$) in titanium content. Consequently, by the heat treatment, potassium hexatitanate crystals are formed and also the excess of titanium is crystallized into titanium dioxide crystals, so that the composite phase of potassium hexatitanate crystals and titanium dioxide crystals as mixed therewith is formed. Depending on the temperature of the heat treatment, the titanium dioxide crystals are formed into a rutile phase or anatase phase.

The proportion of titanium dioxide crystals in the potassium hexatitanate crystal-titanium dioxide crystal composite fiber, although not strictly depending on the required characteristics of the fiber or use thereof, is preferably at least 1 vol. % (about 6 mole %) for the fiber to fully exhibit the effect of its mixed phase.

The composite fiber of the present invention is prepared in the form of a platelike polycrystalline fiber having a diameter of about 20 to about 50 $\mu$m and a length of about 100 to about 400 $\mu$m, although the fiber size is dependent on the structural conditions, especially on the treatment conditions of the potassium removing-loosening proceeding for the primary-phase fiber lump.

As already stated, the titanium dioxide crystals are present as the rutile phase, anatase phase or mixed phase thereof having a specific crystal structure, depending on the potassium content of the fibers or heat-treatment temperature. The rutile phase has higher hardness than the anatase phase (rutile phase about 7.0–7.5, anatase phase about 5.5–6.0 in Mohs' hardness), so that the composite fiber exhibits higher wear resistance when containing titanium dioxide crystals as the rutile phase than when containing the titanium dioxide crystals as the anatase phase.

As compared with the single-phase fiber of potassium hexatitanate, the polycrystalline composite fiber of the present invention consisting of potassium hexatitanate crystals and titanium dioxide crystals has higher wear resistance and coefficient of friction and improved strength as effects of mixture of two phases. Moreover, the mixture of two phases gives the surface of the fiber minute projections or indentations, which afford enhanced adhesive strength at the interface when the fiber is bonded with other material.

A friction material wherein the composite fibers of potassium hexatitanate and titanium dioxide having the foregoing characteristics are incorporated therein has a higher coefficient of friction than the friction material wherein the single-phase fiber of potassium hexatitanate is used. The composite fiber is high in the thermal stability of its coefficient of friction and retains the high coefficient of friction over a high low, wide temperature range. At low to high temperatures, the friction material of the present invention also has higher wear resistance than the friction material comprising chrysotile asbestos fiber.

The composite fiber of the present invention is of polycrystalline structure and therefore locally has interstices at the boundaries of the crystal grains. The interstices serve a cushiony function during use, so that the friction material incorporating the present composite fiber has an additional advantage of abrading the adjoining materials with mitigated impact.

When the composite fiber of the present invention is used for friction materials, it is desired that the friction material contains the composite fiber in an amount of 3 to 50 wt. %. The lower limit of the content is 3 wt. % because when present in smaller amounts, the fiber is unable to fully exhibit its effect, while the upper limit is 50 wt. % since if this limit is exceeded, the effect to give improved friction and wear characteristics nearly levels off.

The friction material of the present invention may have further incorporated therein at least one of various fibrous fillers which are known as fibers to be applied for friction materials when so required, in addition to the composite fiber of potassium hexatitanate and titanium dioxide. Examples of such fillers are synthetic organic fibers (Aramid fiber, etc.), metal fibers (steel fiber, stainless steel fiber, copper fiber, brass fiber, etc.), carbon fiber, glass fiber, alumina silica fiber, silica fiber, mineral wool, slag wool and wood pulp. These fillers are used in a suitable amount (e.g., 1 to 60 wt. %) along with the composite fiber of potassium hexatitanate and titanium dioxide, for example, for the purpose of reinforcing the friction material.

When required, these fibrous fillers are used as surface-treated with a coupling agent so as to be improved, for example, in dispersibility and adhesion to the binder. Examples of useful coupling agents are silane coupling agents (such as vinylsilane, aminosilane, epoxysilane, methacryloxysilane and mercaptoxysilane), and titanate coupling agents (such as isopropyltriisostearoyl titanate and di(dioctylpyrophosphate)-ethylene titanate).

The friction material of the present invention may have further incorporated therein various additives which are generally used as friction and wear modifiers. Examples of useful additives are organic powders such as vulcanized or unvulcanized natural or synthetic rubber powders, cashew resin particles or granules, resin dusts and rubber dusts; inorganic powders such as natural or artificial graphite, molybdenum disulfide, antimony trisulfide, barium sulfate, calcium carbonate and xonotlite; flaky inorganic fillers such as mica and vermiculite; metallic powders such as copper, aluminum, zinc, iron and stainless steel powders; metallic oxide powders such as alumina, silica, chrominum oxide, titanium oxide, iron oxide, antimony trioxide and copper oxide powders; etc. These additives are used singly or at least two of them are used in combination in a suitable amount (e.g., 20 to 80 wt. %) in accordance with the friction characteristics required of the product, such as coefficient of friction, wear resistance and vibration characteristics. Also usable are corrosion inhibitors, abrasives and like auxiliary agents in a suitable amount (e.g., up to 60 wt. %) as required. Thus, the friction material is prepared in the form of a composition including such additives or agents as is the case with conventional friction materials.

Examples of suitable binders are those used for friction materials of the type described, such as resins including epoxy resin, phenol resin, formaldehyde resin, polyester resin, polyamide resins, alkyd resin, silicone resin, polyimide resin and like thermosetting resins and these resins as modified; and rubbers including natural rubber, styrene-butadiene rubber and nitrile rubber.

Like conventional friction materials, the friction material of the present invention can be prepared by dispersing the fibers in a resin serving as the binder to obtain a starting composition with friction and wear modifiers and other additives incorporated therein as desired, and molding the composition with a die or the like with heating and application of pressure for consolidation. Alternatively, the friction material can be prepared by dispersing the starting composition, for example, in water, placing the dispersion over a screen, making the dispersion into a sheet by squeezing water therefrom and pressing the sheet with heating under an increased pressure for consolidation. The product thus molded or shaped can be machined or ground suitably.

EXAMPLES

Preparation of Fibers (1) Composite fiber of potassium hexatitanate and titanium dioxide (examples of the invention)

a. Preparation of raw material

Purified anatase powder (99.8% in purity) and potassium carbonate powder (99.5% in purity) for industrial use were mixed together in such a ratio as to result in a $TiO_2/K_2O$ molar ratio of 1.8.

b. Heating for melting

The raw material was placed into a platinum crucible and melted by heating at 1050° C. for 40 minutes.

c. Cooling for solidification

The melt was poured into a dish-like container (of copper) to obtain a lump of potassium dititanate fibers.

d. Potassium removing-loosening treatment

The lump of fibers was placed into an aqueous solution of sulfuric acid prepared by adding sulfuric acid to water in 150 times the amount (by weight) of the lump of fibers. $K^+$ ions were caused to dissolve out from the fibers with stirring by a propeller while the fibers were being loosened.

e. Heat treatment

The loosened fibers were collected from the solution, dewatered, dried (in air) and thereafter heat-treated in an alumina crucible for 2 hours.

(2) Single phase fiber of potassium hexatitanate (comparative example)

A plate-like polycrystalline fiber of potassium hexatitanate single phase was prepared under the same treating conditions as above except that the aqueous sulfuric acid solution for the potassium removing-loosening treatment was replaced by water (in 150 times the amount of the fiber lump).

Table 1 shows the concentration of acid solution, heat-treating temperature, crystal phase of the final fiber product, etc. according to the examples of the invention and comparative example.

TABLE I

| No. | Concen. of K-removing acid soln. (%) | (*) K content of fibers (wt. %) | Heat-treating temp. (°C.) | Final fiber product Crystal phase | TiO2 (vol. %) |
|---|---|---|---|---|---|
| 1 | 0.5 | 4.4 | 1050 | 6TK + TiO2 (R) | 63 |
| 2 | 0.3 | 6.6 | 1050 | 6TK + TiO2 (R) | 47 |
| 3 | 0.1 | 9.0 | 950 | 6TK + TiO2 (A) | 30 |
| 4 | 0.1 | 9.0 | 1050 | 6TK + TiO2 (R) | 30 |
| 5 | 0.1 | 9.0 | 1150 | 6TK + TiO2 (R) | 30 |
| 6 | 0.05 | 11.2 | 1050 | 6TK + TiO2 (R) | 15 |
| 11 | 0 | 13.6 | 1050 | 6TK | 0 |

Note
6TK: potassium hexatitanate crystals
(A): anatase phase of titanium dioxide crystals
(R): rutile phase of titanium dioxide crystals
(*) K content of fibers was determined after heat treatment and indicates values in the fibers in an anhydrous condition thereof.

No. 1 to No. 6 are examples of the invention, and No. 11 is a comparative example. Each of the final fiber products is in the form of a plate-like polycrystalline fiber measuring about 30 μm in average fiber diameter and about 200 μm in average fiber length (as determined with reference to photographs by the scanning electron microscope).

FIGS. 1 to 5 show images (magnification: ×2000) under a scanning electron microscope of the final fiber products obtained in the respective examples (6TK: potassium hexatitanate crystals, T: titanium dioxide crystals).

Figure 5:
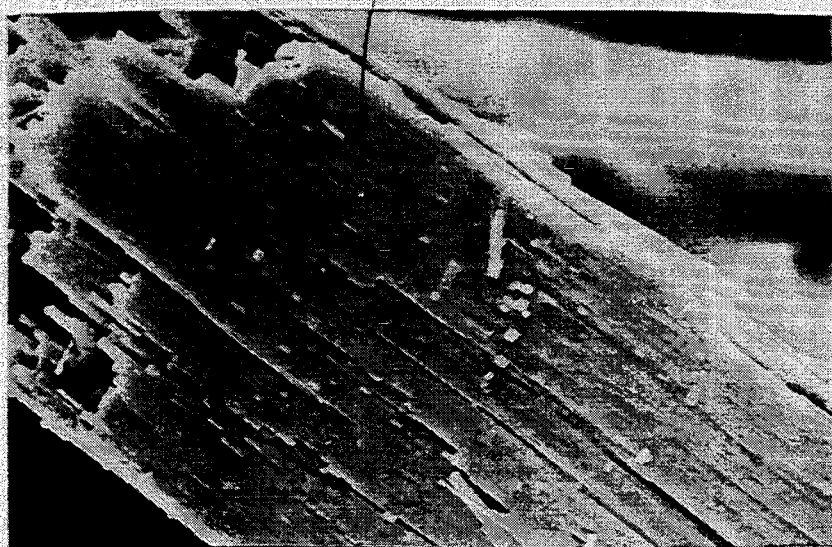
FIG. 5 is a photomicrograph showing a conventional single-phase fiber of potassium hexatitanate.

FIGS. 1, 2, 3 and 4 show the composite fibers of examples No. 1, No. 3, No. 4 and No. 5, respectively, of the invention, and FIG. 5 shows the single-phase fiber of potassium hexatitanate of comparative example No. 11.

Although the final fibers of the examples of the invention and comparative example are not particularly different in form or size, the fiber of the comparative example is a single-phase fiber of potassium hexatitanate crystals only, whereas those of the examples of the invention have a composite phase comprising potassium hexatitanate crystals and titanium dioxide crystals which are present as mixed with the former crystals in a dispersed state.

A further reference will be made to FIGS. 1 to 4 showing fibers of the invention. A comparison between FIGS. 2, 3 and 4 (the potassium-removed fibers shown are all 9% in potassium content, while the heat-treating temperature is 950° C. with FIG. 2, 1050° C. with FIG. 3 or 1150° C. with FIG. 4) indicates that the composite fiber increases in grain size with a rise in heat-treating temperature. A comparison between FIGS. 1 and 3 (the heat-treating temperature is 1050° C. in both cases, while the potassium content is 4.4% with FIG. 1 or 9.0% with FIG. 3) reveals that the amount of titanium dioxide crystal phase increases with a decrease in potassium content. These results show that the type of composite phase of the composite fiber embodying the invention is controllable as desired by varying the amount of potassium to be dissolved out by the potassium removing proceeding and the temperature of the heat-treating proceeding.

Incidentally, larger crystal grains are advantageous because the fiber then becomes more dense and exhibits higher strength.

Strength of Fibers

Some of the composite fibers of the invention and the single-phase fiber of potassium hexatitanate were consolidated into samples using a phenol resin binder, and then tested for the flexural strength, deflection at rupture and strain of the fibers.

The samples were prepared from the fibers No. 4, No. 5 and No. 11 listed in Table 1 by the following procedure. The fiber (70 wt. %) and 30 wt. % of phenol resin were mixed together, and the mixture was compacted (under a pressure of 30 MPa at room temperature for 1 minute) and molded (under a pressure of 15 MPa at a temperature of 170° C. for 5 minutes) into a consolidated piece. The molding was heat-treated (at 180° C. for 3 hours). The sample thus prepared was 7×15×70 mm in size.

The samples obtained were subjected to a 3 point flexural test (span: 40 mm, crosshead speed: 0.5 mm/min). Table 2 shows the results.

TABLE 2

| Sample No. | Breaking load (kg) | Flexural strength (MPa) | Deflection at rupture (mm) | Strain (%) |
|---|---|---|---|---|
| 4 | 182 | 139 | 0.58 | 1.54 |
| 5 | 194 | 152 | 0.63 | 1.66 |
| 11 | 165 | 122 | 0.51 | 1.35 |

The results given in Table 2 reveal that the samples No. 4 and No. 5 each comprising the composite fiber of the invention are higher in flexural strength than sample No. 11 comprising the single-phase fiber of potassium hexatitanate.

Friction and Wear Characteristics (Wear Resistance and Coefficient of Friction)

EXAMPLE 1

Some of the composite fibers of the invention and the single-phase fiber of potassium hexatitanate were each made into a friction material (disk pad), which was then tested for friction characteristics.

The disc pad for testing was prepared by the following procedure. The mixture given below was compacted, molded and heat-treated under the same conditions as for preparing the samples for the foregoing fiber strength test, further followed by grinding. Thus, test pads A1, A2, B and C were obtained.

| Fiber | 30 wt. % |
|---|---|
| Binder (phenol resin) | 20 wt. % |
| Friction and wear modifier (barium sulfate) | 50 wt. % |

The fibers used for the test pads A1, A2 2 and B are No. 4, No. 5 and No. 11 in Table 1, respectively, and the main fiber used for the test pad C is chrysotile asbestos fiber (Class 6).

Test pieces were cut out from the test pads and subjected to the constant-speed friction and wear test (disc friction surface: FC250 gray cast iron, surface pressure: 1 MPa, friction velocity: 7 m/sec) prescribed in JIS D4411, "Motor Vehicle Brake Linings" and thereby tested for coefficient of friction and wear rate. The measurements of coefficient of friction are shown in FIG. 6, and those of wear rate in FIG. 7.

Figure 6:
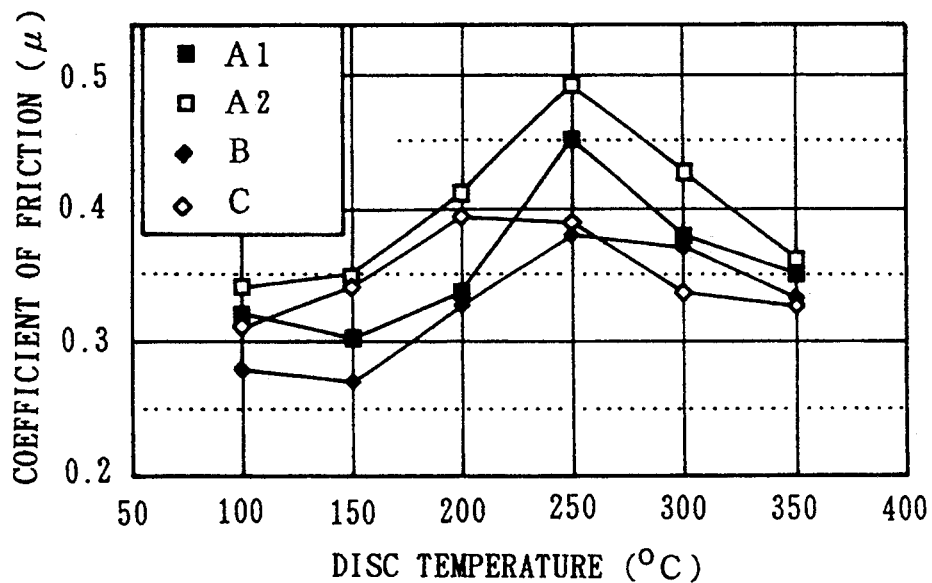
FIG. 6 Is a graph showing the measurements of coefficient of friction obtained for disk pad samples by a constant-speed friction and wear test.

FIG. 6 shows that the test pads A1 and A2 of the invention retain a higher coefficient of friction than the test pad B (incorporating the single-phase fiber of potassium hexatitanate) over the entire range of low to high temperatures. Further the test pads A1 and A2 are higher than the test pad C (incorporating chrysotile asbestos fiber) in coefficient of friction at higher temperatures.

Figure 7:
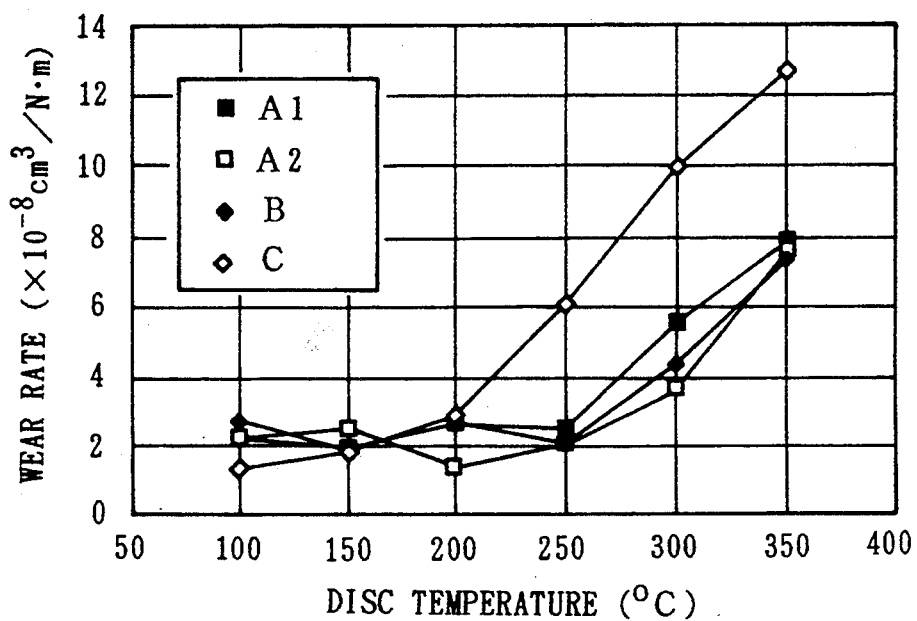
FIG. 7 is a graph showing the measurements of wear rate obtained for the disk pad samples by the test.

FIG. 7 reveals that the test pads A1 and A2 of the invention are low in wear rate and have high wear resistance at higher temperatures.

EXAMPLE 2

Under the same conditions as in Example 1, the following mixture was compacted, molded and heat-treated, followed by grinding, to prepare each of test pads A3, B3 and C3.

| | |
|---|---|
| Fiber-1 | 16 wt. % |
| Fiber-2 (Aramid fiber; Kevlar pulp, 2 mm in length Toray Industries, Inc.) | 3 wt. % |
| Binder (phenol resin) | 9 wt. % |
| Organic additives (cashew dust, etc.) | 9 wt. % |
| Others | 63 wt. % |

With regard to this example, the components of the test pads other than the fiber-1 are typical of those incorporated in automotive brake pads in actual use. The fibers-1 used for the test pads A3 and B3 are respectively No. 5 and No. 11 given in Table 1. The fiber used for the test pad C3 is chrysotile asbestos fiber (Class 6).

Test pieces were cut out from the test pads and subjected to the constant-speed friction and wear test in the same manner as in Example 1. The test results are shown in FIGS. 8 and 9.

Figure 8:
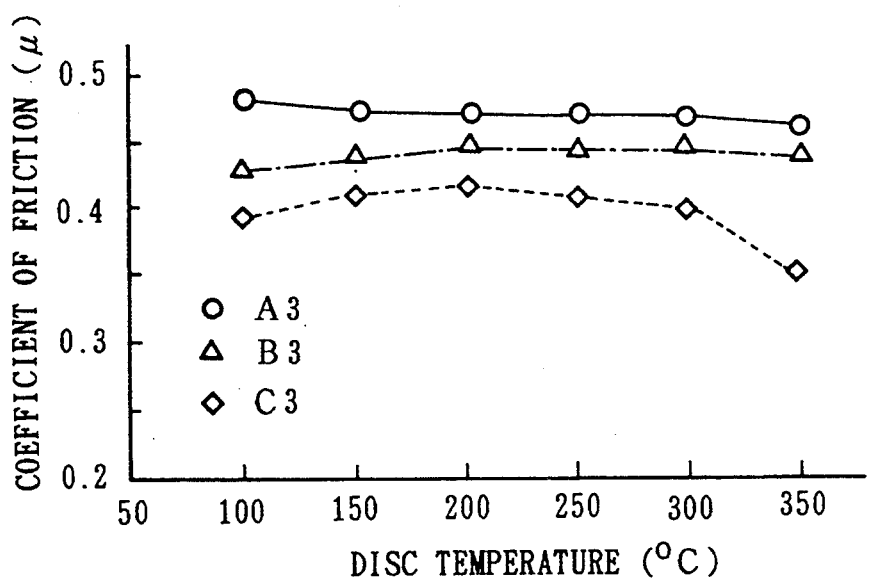
FIG. 8 is a graph showing the measurements of coefficient of friction obtained for disk pad samples by a constant-speed friction and wear test.

FIG. 8 indicates that the test pad A3 of the invention retains a higher coefficient of friction than the test pads B3 and C3 over the entire range of low to high temperatures.

Figure 9:
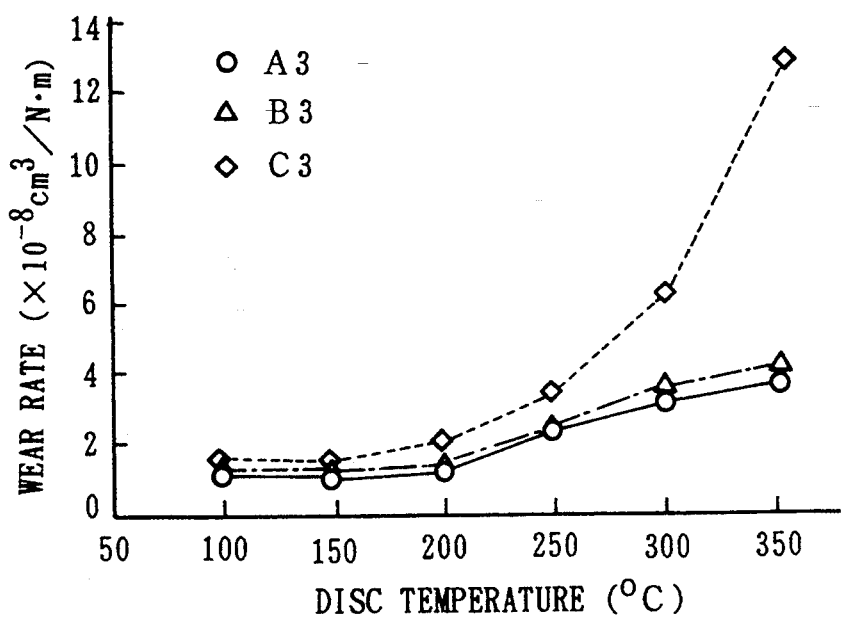
FIG. 9 is a graph showing the measurements of wear rate obtained for the disk pad samples by the test.

FIG. 9 reveals that the test pad A3 of the invention is smaller in wear rate and more resistant to wear than the test pad C3 at higher temperatures.

The potassium hexatitanate-titania composite fiber of the present invention has higher hardness, wear resistance, shear strength, etc. than the single-phase potassium hexatitanate fiber as effects afforded by the presence of titanium dioxide crystals. When the present composite fiber is incorporated in the friction materials for automobiles and like brake devices, the slide surface can be given improved friction and wear characteristics.

The composite fiber of the present invention is useful in place of the single-phase fiber of potassium hexatitanate for other applications, for example, as a filler for heat-resistant wear-resistant coating compositions, as a reinforcing fiber for reinforced plastics, and for refractory or heat-insulating materials to impart improved material characteristics.

The foregoing description of the embodiments and examples is given for illustrating the present invention and should not be interpreted as limiting the invention defined in the appended claims or reducing the scope thereof. The present invention is therefore not limited to the embodiments and examples described but can be modified variously by one skilled in the art without departing from the spirit of the invention as set forth in the claims.

What is claimed is:

1. A composite fiber prepared by a melting process, the fiber being a polycrystalline fiber consisting of potassium hexatitanate crystals and titanium dioxide crystals mixed therewith.

2. The composite fiber as defined in claim 1 wherein the melting process comprises steps of heating as a raw material a mixture of a titanium compound convertible to titanium dioxide by heating and a potassium compound convertible to potassium oxide by heating in a ratio resulting in a $TiO_2/K_2O$ molar ratio of 1.5 to 2.5 to prepare a melt, cooling the melt to obtain a lump of potassium dititanate fibers, treating the lump of fibers in a wash liquid to dissolve out $K^+$ ions, while loosening the fibers, until the potassium content of the fiber decreases to 1 to 13.5 weight % on the basis of an anhydrous condition of the fiber, and heat treating the resulting fibers at a temperature of 900° to 1300° C.

3. The composite fiber as defined in claim 1 wherein the potassium content included in the fiber is 1 to 13.5 weight %.

4. The composite fiber as defined in claim 1 wherein the potassium content included in the fiber is 4.4 to 11.2 weight %.

5. The composite fiber as defined in claim 2 wherein the heat treatment is controlled at a temperature of 1050° C. or higher.

6. A friction material wherein fibers are consolidated with a resin binder, the friction material being characterized in that it includes composite polycrystalline fibers consisting of potassium hexatitanate crystals and titanium dioxide crystals mixed therewith, in an amount of 3 to 50% by weight.

* * * * *